United States Patent [19]

Fischer

[11] 4,437,308

[45] Mar. 20, 1984

[54] ROTARY HEAT ENGINE

[75] Inventor: Victor H. Fischer, Artarmon, Australia

[73] Assignee: Thermal Systems Limited, Cayman Islands, British West Indies

[21] Appl. No.: 215,824

[22] Filed: Dec. 12, 1980

[30] Foreign Application Priority Data

Aug. 18, 1980 [AU] Australia .............................. PE5095

[51] Int. Cl.³ .............................................. F01K 7/36
[52] U.S. Cl. ...................................... 60/514; 60/651; 60/670
[58] Field of Search ................. 60/508, 511, 514, 643, 60/645, 651, 670, 671; 122/249; 418/15, 77, 152

[56] References Cited

U.S. PATENT DOCUMENTS

| | | | |
|---|---|---|---|
| 663,972 | 12/1900 | Loeffler | 418/77 |
| 1,746,158 | 2/1930 | Loffler | 122/249 X |
| 2,429,035 | 10/1947 | Steving, Jr. | 60/645 |
| 3,251,183 | 5/1966 | Whitlow | 60/514 |
| 3,535,872 | 10/1970 | Kelly | 60/519 |
| 3,881,849 | 5/1975 | Commarmot et al. | 418/152 X |
| 3,972,194 | 8/1976 | Eskeli | 60/650 |
| 4,059,370 | 11/1977 | Gibson | 418/152 X |
| 4,109,468 | 8/1978 | Heath | 60/670 |

Primary Examiner—Allen M. Ostrager
Assistant Examiner—Stephen F. Husar
Attorney, Agent, or Firm—Bernard, Rothwell & Brown

[57] ABSTRACT

A rotary external combustion engine wherein energy is supplied to a working space of the engine by direct injection into the stator of liquid water at a high temperature and pressure. The water acts as a heat-transfer medium. Some of the liquid water spontaneously vaporizes on injection, during the rotor. Liquid water is exhausted from the working space and recycled to an external heat exchanger for reheating prior to reinjection. The engine is capable of a thermal efficiency greater than that of the Rankine cycle.

29 Claims, 6 Drawing Figures

ROTARY HEAT ENGINE

The present invention relates to a rotary external combustion engine, i.e., an engine of the type having a stator and a rotor defining a working space of variable volume and wherein heat energy for powering the engine is supplied externally of the working space. In particular, the invention provides a novel operating cycle.

Many attempts have been made to produce an engine which combines high thermal efficiency in terms of converting applied heat energy into useful work, with acceptable power to weight and power to volume ratios for the engine. The internal combustion engine has a good power to weight ratio but a relatively low thermal efficiency. Of such internal combustion engines, the diesel engine is generally accepted to have one of the best thermal efficiencies (up to around 40 percent). Thermodynamically more efficient engines based on the Carnot, Stirling and Ericsson cycles have been built but these have not in general been commercial successes, largely on account of the problem of providing a small and efficient heat exchanger enabling the worker gas to become quickly and efficiently heated by the external heat source.

The steam engine is a well known form of external combustion engine but its power to weight ratio is generally low, owing to its requiring a separate steam boiler and condenser. The steam engine generally uses dried steam or other dry vapor as the working fluid. Moreover, the efficiency of the steam engine is restricted by the limitations of the Rankine cycle.

The external combustion engine of this invention may comprise one or more stators and one or more rotors defining the working space or spaces. Usually, the stator has a cylindrical bore in which the rotor is eccentrically mounted. The rotor may be provided with vanes so as to define between the stator and the rotor at least one working space of crescent-like shape. As the eccentric rotor rotates within the stator, the volume of each working space increases from a minimum to a maximum and then decreases to the minimum again every revolution. The construction of this embodiment is analogous to the construction of a vane-pump. However, other stator and rotor configurations are possible, In particular, the stator need not be cylindrical in cross-section but may be provided with two, three, four, five or more lobes. The rotor also need not be circular in cross section and may be provided with a plurality of ridges which define with the stator the working space.

However, in a preferred embodiment, the rotor is of cylindrical cross-section and is provided with two or more vanes slidable in slots provided in the rotor so as to accommodate changes in the spacing between any given point on the rotor and the opposite point on the stator, as the rotor rotates. Preferably, each vane is provided with biasing means to resiliently bias it against the bore of the stator, thereby sealing each working space. Such biasing means may be in the form of a spring, such as a coil or leaf spring, disposed in the bottom of each slot and operative between the bottom of the slot and the bottom of the respective vane to bias the vane outwardly.

Preferably, sealing means are provided between the axial ends of the rotor and the stator to prevent leakage. Such sealing means are well known in the art and may include O-rings or labyrinth seals.

The heat exchanger may comprise a fuel burner. Combustion gas may be fed to the burner at or above atmospheric pressure. It is preferred to provide a compressor to provide pressurized gas for the burner. Such compressor may be a rotary compressor, such as a vane or turbine compressor driven from the engine. Alternatively, the compressor may be a reciprocating compressor driven from the engine.

An injector is also provided for injecting a pressurized preheated liquid heat-transfer medium into the working space. The purpose of the injected liquid medium is to enable heat transfer from the burner to the working space to be effected quickly and efficiently.

Some liquid heat-transfer medium flashes to a vapor on injection into the working space.

To avoid confusion the following terms used herein will be clarified. The heat-transfer medium may be present in its liquid or vapor state. The term wet vapor is used to mean that the injected medium is present in both its liquid state (e.g. as droplets) and in its vapor state simultaneously.

Preferably, the liquid medium is heated by means of a fuel burner in a compact heat exchanger, for example a coil of narrow bore tubing, to a high pressure and high temperature. Sinch such narrow bore tubing can withstand great pressures, it is possible to heat the liquid medium up to its critical point. For special applications where the rate of heat transfer is to be high, it may be preferred to heat the medium to a temperature and pressure above its critical point. The hot pressurized liquid medium is then injected into the working space. Internal energy of the heat-transfer medium is rapidly transferred from the hot liquid droplets to the working space as liquid vaporizes, thereby increasing the pressure very quickly. The vapor in the working space expands (usually polytropically i.e. non-adiabatically) to drive the rotor.

When the working space has reached approximately its maximum volume the vapor and liquid medium are exhausted from the working space.

The heat-transfer medium is a vaporizable liquid, such as water, some of which flashes to vapor following injection into the working space. Thus, heat transfer between the hot water vapor and the working space is very rapid.

Therefore, it may be seen that the injected liquid is merely acting as a heat transfer fluid which enables the vapor in the working space to convert internal energy to mechanical work. It is desirable that the heat-transfer medium has a high thermal conductivity in order to maximize heat transfer in the heat exchanger. The medium is preferably selected from water, oil and mixtures thereof. Mixing may occur internally or externally of the working space. It is possible that the working space may contain vaporizable heat-transfer medium which may be caused to vaporize by injection of heated liquid medium (which itself need not be vaporizable). In order to assist lubrication of the engine, the water may be used as a mixture with an oil e.g. as an emulsion, dispersion or as a solution of water and a water-soluble oil.

During operation, a residual amount of vapor from vaporization of the heat-transfer medium, and usually some liquid, will always be present in the working space.

The retention of some residual liquid medium in the working space after exhaust is desirable for reasons which will appear more clearly later, since it reduces the pressures achieved during the compression cycle.

Thus, it may be desirable to construct the stator and/or rotor such that some liquid medium is retained in the working space after exhaust. Generally, this may be achieved by providing appropriate recesses in the stator or rotor.

The pressure in the working space when the liquid is exhausted will generally be greater than atmospheric pressure (1 bar) and it will generally be preferred to depressurize the exhausted medium to substantially 1 bar pressure. The pressure when the working space has its minimum volume is determined by the compression ratio. The compression ratio may vary widely depending on the particular application of the engine. Thus, in some applications a compression ratio as low as 1.5:1 or perhaps lower may be employed. In other applications the compression ratio may be as high as 20:1.

The present invention is to be distinguished from a steam engine in that the heat-transfer medium is maintained in its liquid form and not allowed to vaporize until it is introduced into the working space. This is in sharp contrast to a steam engine, wherein even if a flash boiler is used, the water is always introduced into the cylinder in the form of steam. In fact, since it is necessary to superheat the steam to remove water droplets in a conventional steam engine, it is not possible to directly flash liquid water into the cylinder of a steam engine since this would give rise to water droplets in the cylinder. However, in the engine according to the present invention, it is preferred that the majority of the water be present in the working space as liquid droplets since this reduces the amount of recondensation to recover latent heat of vaporization which need occur.

Since the majority of the water is injected and exhausted in the liquid state, there is substantially no entropy increase due to vaporization. In the Rankine cycle all of the liquid must be vaporized and then condensed, and this requirement represents a theoretical limit on the efficiency of a steam engine since work must be performed to recondense the exhausted steam to liquid water. There is no such limit in the engine of the present invention since the majority of the heat-transfer medium does not usually change its state. Almost all of the internal energy lost by the injected liquid water may converted into useful work. Thus, efficiency of the cycle of the present invention is greater than the efficiency of the Rankine steam cycle.

It is necessary that the heated heat-transfer medium be maintained in the liquid state prior to injection. Although this may be achieved by using appropriate sensors to ensure that the temperature at a given pressure never exceeds the medium's boiling point, it has been found that if an orifice of suitable size is connected to the heat exchanger in which the liquid medium is heated and a flow of liquid medium is maintained through the heat exchanger, then the application of heat to the liquid medium does not cause the liquid to boil. Thus, by correct choice of orifice size, complex temperature and pressure sensing devices may be avoided. So long as the orifice provides a pressure drop, the pressure in the heat exchanger will at all times be such that, as the temperature is increased, the pressure of the water in the heat exchanger will also increase and thereby be always below the boiling point. The orifice, of course, may form part of the injection means through which the liquid medium is injected into the working space.

The rate of working of the engine may be controlled by any of several means. For example, it may be controlled by varying the amount of heat-transfer medium injected into the stator. The rate of working of the engine may be controlled by controlling the amount of heat supplied by the burner, for example, by controlling the fuel supply to the burner (for a constant liquid volume injection rate). The rate of working of the engine may be controlled by controlling the rate of injection of liquid medium, e.g., by using a variable displacement pump.

Usually, the heat-transfer medium is recovered after it has been exhausted from the working space. The exhausted medium will still be somewhat heated and may be recycled again to the heat exchanger so that its internal energy is not lost. In this way, the medium acts merely as a heat transfer fluid and is not substantially used up.

Water is a preferred heat transfer medium. Means may be provided for recovering water produced by combustion in the burner. Thus, it may be possible to avoid any need for make-up water since this will be provided by water from combustion in the burner.

The gas fed to the burner is capable of taking part in the combustion process which occurs in the burner. The gas may be a gas capable of supporting combustion, such as oxygen, air or other oxygen-containing gas, or nitrous oxide. Alternatively, the gas may itself be a combustible gas chosen from all known combustible gases, such as gaseous hydrocarbons, carbon monoxide or hydrogen.

The fuel burnt in the burner itself may be chosen from known combustible fuels such as gasolines, fuel oils, liquefied or gaseous hydrocarbons, alcohols, wood, coal or coke.

It is in general preferred to use various heat recovery means. Thus, the whole engine may be enclosed in a heat insulating enclosure and be provided with heat exchangers to pick up stray heat and transfer it, for example, to preheat the fuel for the burner. It is also preferred to recover the heat remaining in the burner flue gases and this may be achieved by passing the flue gases through a spray chamber in which a stream of liquid (generally the same liquid medium as that injected into the engine) is sprayed through the flue gases. It is preferred that the liquid medium be sprayed through the flue gases to heat the liquid medium close to its boiling point prior to being passed to the heat exchanger. Moreover, when water is employed, the use of a water spray chamber or condenser is advantageous in that water from the burner may be condensed out of the flue gases so that it is not necessary to provide make-up water to the engine. Usually exhausted heat-transfer medium includes a proportion of vapor. This vapor may be separated from liquid medium in a trap and fed with combustion gas to the burner, thereby preheating the combustion gas and condensing more of the vapor.

The construction of an engine according to the present invention is considerably simplified in certain respects in comparison with known engines, such as internal combustion engines. Thus, the temperatures encountered in the working space are generally reduced, thereby simplifying sealing between the working spaces. It will be appreciated that power may be provided in the engine of the present invention at much lower temperatures than, for example, an internal combustion engine. Moreover, the internal combustion engine is less thermally efficient in that means must be provided to cool the cylinders and prevent seizing up.

Moreover, since the temperatures encountered in the engine are relatively low, for example up to 250° C., it is not usually necessary to construct the cylinder of metal. Plastics such as polytetrafluorethylene (PTFE), fiber-reinforced resins, and other plastics used in engineering, are particularly advantageous due to their cheapness and ease of use. In some constructions the use of plastics materials having a low heat conductivity can be an advantage in ensuring that that portion of the stator at which heat is introduced into the working space is kept at a relatively high temperature, whereas the outlet is kept at a relatively low temperature. Other heat insulating materials such as wood, concrete, glass or ceramics may also be used.

Power is taken from the engine by means of a shaft attached to the rotor. It will be appreciated that the engine is susceptible of high speed operation and is thus ideal for providing a small power plant suitable for a mobile vehicle. The engine is also ideal for high speed applications such as generating electricity.

In comparison to a steam engine, the engine of the present invention is less bulky in that a large high pressure boiler is not required since the liquid is heated in its liquid state in a very much smaller heat exchanger. Also, there is no need for a condenser, although a trap or spray chamber to recycle water is desirable. In comparison to the internal combustion engine, the engine of the present invention may be thermally more efficient, both in terms of the amount of heat converted to work in the working space and also in terms of the amount of heat obtained from the fuel burnt, since complete combustion is rarely obtainable in an internal combustion engine. The burner parameters of the engine of the present invention may be optimized so as to ensure substantially complete combustion of the fuel in the burner, thereby substantially eliminating pollution in the form of unburnt fuel or carbon monoxide.

In comparison to known gas engines, the present invention allows the bulky gas heat exchanger to be replaced by a compact liquid burner.

BRIEF DESCRIPTION OF THE DRAWINGS

Embodiments of the invention will now be described with reference to the accompanying drawings wherein.

DESCRIPTION OF THE PREFERRED EMBODIMENT

Figure 1:
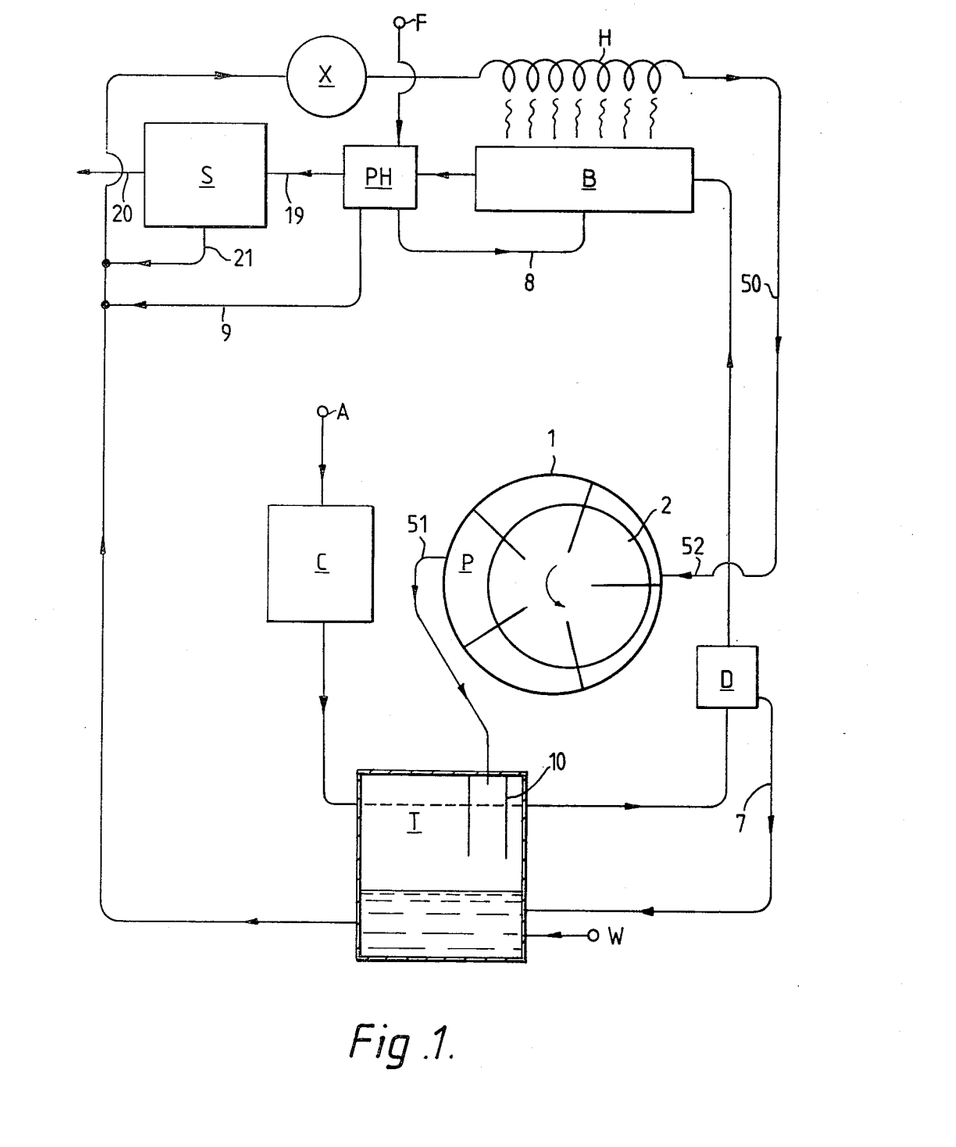
FIG. 1 is a schematic view of a rotary external combustion engine according to the present invention.

In carrying out the invention in one form thereof, the rotary external combustion engine, shown in FIG. 1, comprises a stator 1 having a cylindrical bore, an eccentrically mounted cylindrical rotor 2 rotatable within the stator, vanes 3 slidably mounted on the rotor and defining working spaces P, a compressor C for feeding compressed air to burner B via trap T. The compressor C may be a rotary compressor. The engine further comprises a pump X for feeding pressurized water to the heating coil H of a heat exchanger, and a spray chamber S for spraying water through flue gases from the burner B so as to cool and wash the flue gases and preheat the water. An optional preheater PH is provided for preheating fuel to the burner and is especially applicable for heavy fuel oils. The trap T is for recovering and separating vapor and liquid water from the exhaust from the working space.

Atmospheric air A is compressed by compressor C and fed to the burner B via trap T.

Initially, a working space P has substantially its maximum volume. On rotation of the rotor 2 in the direction indicated in the arrow the volume of the working space P decreases. When the working space volume is substantially at a minimum, hot liquid is injected through inlet 52 so as to heat the working space.

The arrangement shown in FIG. 1 uses water, which is a vaporizable fluid, as the heat-transfer medium. However, other suitable vaporizing liquids might be used.

The injected water is at a high temperature and under a sufficient pressure to maintain it in its liquid state. As the water is injected into the working space P, a portion of the water immediately flashes to vapor, thereby increasing the pressure in the working space. Further rotation of the rotor 2 allows expansion of the vapor as it does work and leads to a reduction in its temperature and pressure.

The compression ratio employed may vary widely depending on the particular application of the engine, Thus, in some applications a compression ratio of 1.5:1 or perhaps lower may be employed. In other applications the compression ratio may be as high as 20:1.

On further rotation, the working space P reaches outlet 51 through which gas and liquid are exhausted to trap T. On further rotating of the rotor 2 the cycle recommences.

Exhaust from outlet 51 contains liquid and vapor. Trap T having a baffle 10 is provided in order to recover the liquid water droplets from the exhaust from the working space P. The dry saturated vapor in trap T is mixed with compressed air from compressor C, thereby preheating the combustion air which is at substantially atmospheric pressure and which is then passed to the burner B. Make-up water W may be fed to trap T as desired.

An optional dryer D is interposed between the trap T and the burner and liquid condensate is returned along line 7 to the trap.

The preheater PH preheats fuel F which then passes to the burner along line 8. Any water thereby condensed from the flue gas is recycled via line 9 to the pump.

Thus, the operation of the engine is as follows. Preheated water from the spray chamber S is fed by means of a high pressure pump X (for example a positive displacement piston pump) to a heating coil H formed of narrow bore tubing. The water is then heated by means of the burner B to a high temperature and pressure, for example 300° C. and 86 bar. In principle, the water may be heated to any temperature above or below its critical temperature and pressure (220.9 bar and 374° C.), however the pressure will always be such that at any temperature it will maintain the water in its liquid state. The hot pressurized water then passes through a pipe 50 to an inlet 52 to the interior bore of the stator 1. The inlet 52 communicates with a pair of closely spaced ports 53 which are arranged side by side such that at any given time only one of them is obstructed by a vane 3, thereby ensuring continuity of flow into the working spaces of the rotor/stator assembly (see FIG. 4). The working space in communication with a port 53 contains compressed and somewhat heated residual water vapor and residual liquid water. On entering the working space a small proportion of the hot pressurized liquid water instantaneously flashes to vapor, thereby increasing the pressure in the working space at substantially constant volume (i.e. along line bc in FIG. 5). The hot pressurized vapor expands, rotating the rotor 2 in the direction indicated by the arrow until the working space encounters the outlet 51. This corresponds to the line cd in FIG. 5 and results in increase in volume with decrease in pressure and temperature. The wet vapor exhaust is then fed to the trap T to preheat air supplied to the burner.

Figure 2:
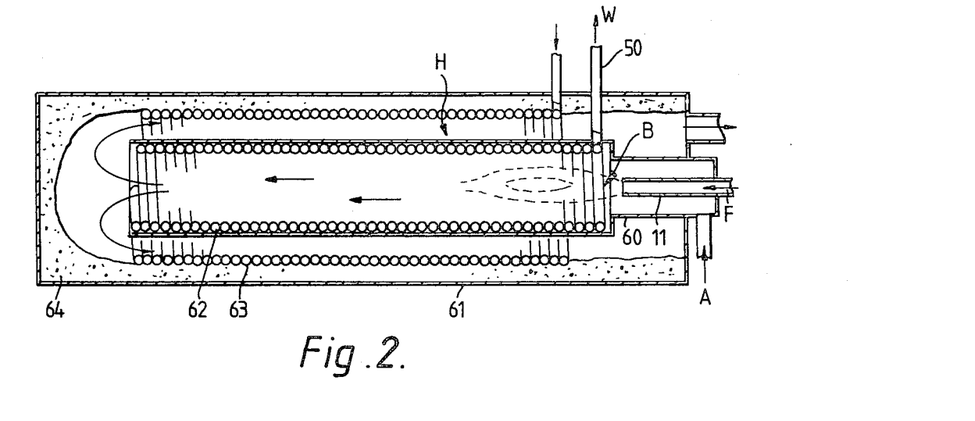
FIG. 2 is a schematic cross-sectional view of a heat exchanger of the engine.

FIG. 2 shows the construction of the heat exchanger, which combines the heating coil H and the burner B. The heat exchanger comprises inner and outer coaxial sleeves 60 or 61, respectively, defining a double path for flue gas from the burner. Insulation 64 is provided around the outside of the heat exchanger. A fuel inlet jet is provided for burning fuel F in air A admitted via an air inlet. Water W passes through a heating coil 63 in the direction indicated by the arrows such that water exits from inner coil 62 at a position close to the highest temperature of the burner. The hot pressurized water is then fed along pipe 50 prior to injection into the working space P.

The heat exchanger may be provided with suitable temperature and pressure sensing devices to ensure that the liquid in the heating coil H is always maintained in its liquid state and not allowed to vaporize. However, it has been found in practice that it is not necessary to carefully monitor the temperature and pressure to avoid vaporization. Thus, it has been discovered that, provided the heating coil H is always in communication with an aperture through which the liquid is continually passed (i.e., one or other of the inlet ports 53) the application of further heat in the heater coil H causes an increase in temperature and pressure but does not, at least in the case of water, cause the liquid to boil. It is, of course, necessary that the aperture (or ports 53) be suitably sized to maintain the necessary pressure differential across it. However, this may be established by the skilled man by suitable experimentation.

Thus, the rate of working of the engine may be controlled simply by controlling the amount of heat provided by the burner B.

Figure 3:
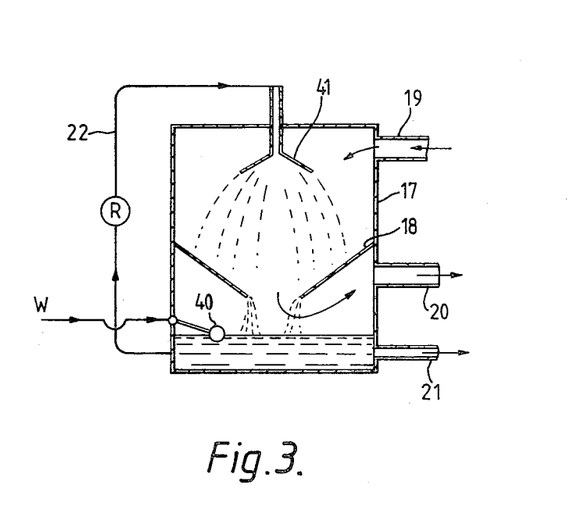
FIG. 3 shows a spray device for cooling flue gas from the burner.

FIG. 3 shows a spray device for cooling and washing the flue gases from the burner B and thus recovering some of the heat and some water produced by the combustion. It comprises a spray chamber 17 having therein a funnel 18 onto which water is sprayed by spray 41 through the stream of hot flue gases. The flue gases are inducted via inlet 19 and arranged to flow tangentially round the chamber before exiting through the exit 20 as cooled flue gas. The flue gases thus pass through the spray and then through a curtain of water falling from the inside aperture of the funnel 18. Preferably, the flue gases are cooled to below 100° C. so as to recover the latent heat of vaporization of water vapor from the trap T and also to recover water produced by combustion in the burner. Water at substantially 100° C. exits through the outlet 21 before being fed by metering pump X into the heat exchanger. If necessary, cold feed water W may be introduced into the chamber via a ballcock 40 for maintaining a constant level of water in the bottom of the spray chamber. A recycle pump R and associated ducting 22 is provided for recycling the water through the spray to bring it up to its boiling point. However, in practice if it is desired to cool the flue gases below 100° C., it may be necessary to withdraw water through the outlet 21 at a substantially lower temperature, e.g. 50° C.

Figure 4:
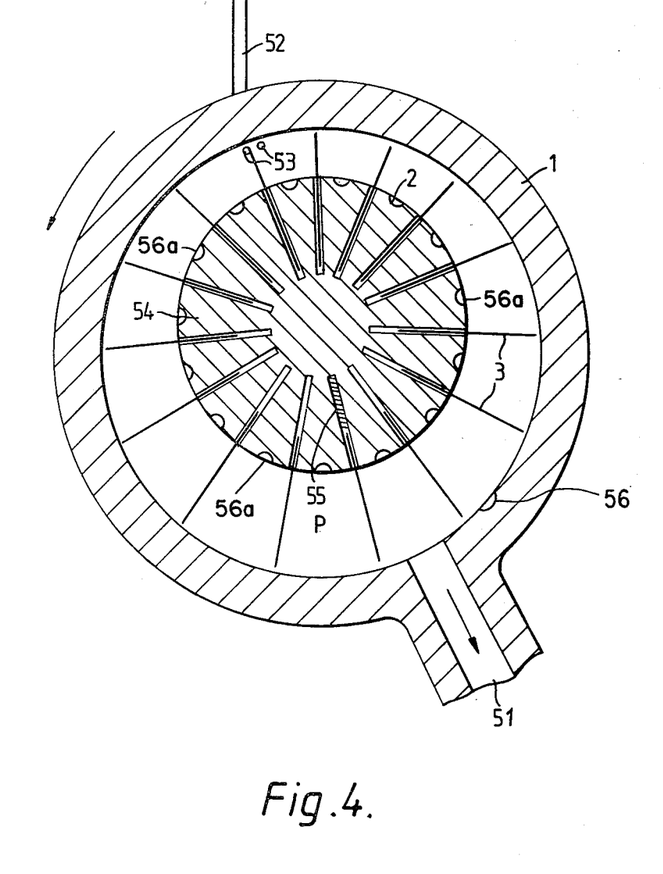
FIG. 4 shows in partial cross section a stator and rotor assembly of the engine.

FIG. 4 shows in detail the construction of the rotor/stator assembly. For temperatures up to several hundred degrees centigrade, the assembly may be formed of suitable plastics material, which enables the assembly to be lightweight and to be produced relatively cheaply. However, if higher thermal efficiencies and thus higher temperatures are required, other appropriate materials such as metals may be used. The rotor 2 is eccentrically mounted within the cylindrical bore of the stator 1 and conventional sealing means are provided at the ends of the bore so as to seal the rotor to the stator. Each vane 3 provided on the rotor 2 is slidably disposed in a respective slot 54 and outwardly biased by means of a coil spring or leaf spring 55 (only one shown) disposed in the bottom of the slot. The rotor is mounted on a rotatable shaft (not shown) which extends out of the stator 4 supplying power.

The inlet 52 for injecting the heated pressurized liquid into the working spaces communicates with a pair of adjacent ports 53 in the end surface of the cylindrical bore of the stator. The use of a pair of ports 53 ensures that while one of the ports is obstructed by the edge of a vane 3, liquid continues to be injected through the other port 53 thereby ensuring continuity of liquid flow from the heating coil H. Thus, abrupt shocks to the high pressure liquid are avoided. Liquid flows continuously through the inlet 52 into whichever of the working spaces is in front of the inlet port 53. Therefore, no complicated valving is required.

The outlet 51 opens into the interior bore of the stator and exhausts from each working space P in turn during rotation of the rotor. The outlet 51 is disposed approximately 180° of rotation away from the inlet 52.

The construction shown in FIG. 4 is also advantageous in that it is desirable to maintain the outlet 51 as cool as possible to reduce the temperature of the exhaust, while keeping the temperature of the stator in the region of the hot pressurized liquid inlet 52 as high as possible so as to ensure a high temperature at which heat is introduced to the working space. This improves the thermal efficiency with which work is derived from the heat supplied to the working spaces. The use of a material, such as a plastics material of low thermal conductivity for the stator 1 enables a higher temperature differential to be maintained between the outlet 51 on the one hand and the hot liquid inlet 52 on the other hand. This disposition of the inlet and outlet approximately 180° apart assists in maintaining the desirable temperature differential.

To retain a small amount of residual water in the stator, recesses, one of which is shown at 56, may be provided. Alternatively, the outlet 51 could be formed to include a plurality of ports arranged along a plane so that the lands between the ports would serve to retain a small amount of residual water. If desired, the rotor, or the vanes thereof, could be formed to include recesses or flanges for retaining a small amount of residual water, as shown at 56a.

Figure 5:
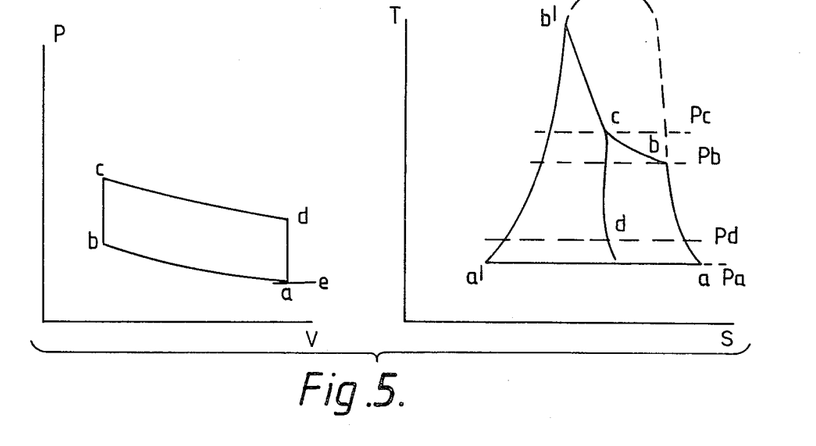
FIG. 5 shows pressure (P) versus volume (V) and temperature (T) versus entropy (S) relationships for the rotary external combustion engine of the present engine.
Figure 6:
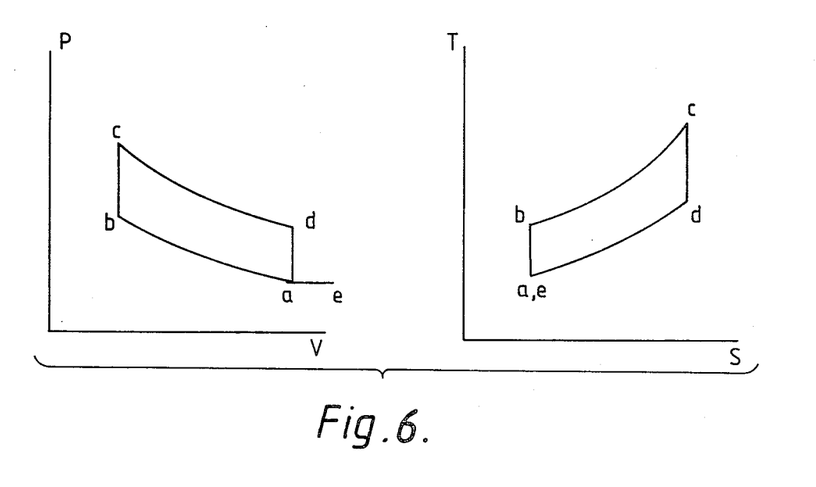
FIG. 6 shows for comparison the PV and TS diagrams for the known two-stroke internal combustion engine.

FIG. 5 shows the idealized thermodynamic operation of the engine of FIG. 1. FIG. 6 shows for comparison the operation of a conventional two-stroke internal combustion engine.

Without wishing to be in any way limited to any specific theory, it is believed that the operation of the engine may be represented as follows.

FIG. 5 shows PV and TS diagrams. Only a small portion of the injected water flashes to vapor, the majority remaining in the liquid phase as droplets.

At all times there is a residual volume of residual water liquid and vapor in the working space. To a first approxmation, the residual water vapor may be regarded as a gaseous working fluid which takes up and gives out heat during each operating cycle, thereby doing work.

Water vapor in the working space P is compressed along line ab. The compression is not isoentropic due to vaporization of residual water in the working space.

The vaporization of residual liquid water in the working space during compression results in a reduction of entropy of the vapor. If there were no residual liquid water in the working space, adiabatic compression of the water vapor would cause the line ab in the TS diagram to be vertical, i.e., the water vapor would be superheated. However, in the presence of liquid water any tendency for the water vapor to become superheated is counteracted by vaporization of some of the liquid. Thus, the line ab follows the dry saturated vapor line on the entropy dome (shown in dotted lines) for water.

At constant volume hot pressurized liquid water is injected at point b at a higher temperature than the working space, and a small portion of the water vaporizes so that the pressure increases along bc from $P_b$ to $p_c$. The temperature T of the dry saturated vapor also increases while the entropy of the dry vapor decreases to c.

As the rotor rotates the wet water vapor expands along cd; however, due to the presence of hot liquid water droplets the expansion is not adiabatic but polytropic due to heat transfer from the liquid water so that the curve cd on the PV diagram is flattened. The expansion also produces a fall in T and a small increase in entropy S.

On exhaust from the working space the pressure in the working space falls along da.

The figure a', b', c, d in the TS diagram represents the cycle undergone by the liquid water. Thus, the liquid water is heated in the heating coil along a'b' and injected into the working space at b'. The temperature of the liquid water then falls along b'c after injection and thereafter the liquid and vapor are in equilibrium.

Typical operation is as follows. The pressure $P_a$ at a is 1.2 bar and the temperature $T_a$ is 378K (105° C.). At a compression ratio of 16:1 the pressure $P_b$ and temperature $T_b$ at b rise to around 22 bar and 490K (217° C.). Liquid water at 573K (300° C.) and 86 bar is then injected into the working space at c and a small amount becomes vapor. Typically, for a 15 horsepower output about 5 ml of water is injected. This causes an increase in pressure along bc (typically $p_c = 30$ bar) and an increase in temprature due to injection of the warmer water ($T_c = 507K$ (234° C.)). The reduction in entropy along bc of the water vapor originally in the cylinder arises from the injection of water in the liquid state. As the working space expands, the water vapor expands along cd to a pressure $P_d$ of about 2 bar and a theoretical temperature $T_d$ of about 383K (120° C.).

The water vapor and liquid water are then exhausted from the working space along da causing a decrease in temperature and pressure, and an increase in the entropy of vapor in the working space.

FIG. 6 shows PV and TS diagrams for the known two-stroke cycle internal combustion engine for comparison. Air is inducted at a and compressed adiabatically and isoentropically along ab. The temperature at b is greater and the slope of ab steeper than for the cycle of the present invention. The presence of liquid water in the working space in the cycle of the present invention flattens ab since energy is needed to vaporize liquid water during compression.

In the two-stroke cycle fuel is then burned in the cylinder, increasing the pressure, temperature and entropy along bc. In the cycle of the present invention the pressure increases slightly due to some liquid water flashing to vapor, and the temperature of water vapor in the working space increases. However, whereas in the two-stroke cycle there is an increase in entropy along bc, in the cycle of the present invention there is a decrease in entropy of the water vapor in the working space due to the addition of liquid water on injection.

Thereafter adiabatic isoentropic expansion occurs along cd, heated liquid water in the working space in the cycle of the present invention giving up heat and thereby causing a flattening of the PV curve in comparison to the curve for the two-stroke cycle internal combustion engine.

The high thermal efficiency of the cycle of the present invention resides in the fact that, whereas in the two-stroke cycle internal combustion engine the gas exhausted from the cylinder is at a high temperature and pressure, in the present invention only liquid water and a small amount of vapor is exhausted. Thus, liquid water is injected into and exhausted from the working space.

Most of the injected water after injection remains in the liquid state (ignoring the small amount of water which flashes to vapor) and so there is no significant entropy increase due to vaporization, and the internal energy lost by the injected water is converted almost completely into useful work. Moreover there is no need to scavenge the working space at the end of the cycle, in the present invention, so that heat of the water vapor is not lost. The presence of the residual liquid water droplets on the walls of the working space ensures that it contains the required residual water vapor ready for recommencement of the cycle. The line ae represents the opening of the exhaust valve before the end of the stroke.

The external combustion engine shown is capable of very high thermal efficiency. Theoretically, cold fuel F, cold air A and cold water W (if necessary) are inducted into the engine, and cold flue gases are vented. Therefore, almost all the heat given out by the burner may become converted into work. In practice, efficiencies of the order of 50 to 60% appear to be attainable.

It will be appreciated that the engine of the present invention may be simply constructed since it requires no valves and does not require high strength materials. The high rotational speeds obtainable make the rotary external combustion engine ideally suited for application to vehicles, where a high power to weight ratio is needed. Thus, the rotary external combustion engine according to the present invention features power to weight and power to volume ratios comparable to internal combustion engines but having a superior thermal efficiency. Moreover, since it is possible to arrange the combustion conditions in the burner to an optimum, it is possible to achieve almost complete combustion of the fuel to carbon dioxide and water and thus avoid carbon monoxide or unburnt fuel impurities in the exhausted flue gases. In particular, since the combustion may be arranged to occur substantially at atmospheric pressure, there is almost no generation of nitrogen oxides during the combustion process. Therefore, this engine represents an improvement over internal combustion engines not only in terms of thermal efficiency but also as regards pollutant emissions.

Moreover, the engine is capable of utilizing a wide variety of fuels, for example gasoline, fuel oil, gaseous or liquefied hydrocarbons (including methane, butane and propane), alcohol and even solid fuels such as wood, coal and coke. The burner parameters may be adjusted to ensure substantially complete and pollution-free combustion. Furthermore, such an engine could be made to run more quietly than conventional internal combustion engines.

While it is contemplated that this invention will be carried out by manufacturing new engines incorporating the features disclosed in this invention, it may also be carried out by converting some existing rotary motive devices to operate in accordance with the principles of this invention. For this purpose a kit may be supplied incorporating the necessary components for making such a conversion. Such a kit would include a heat exchanger, including a fuel-air burner, for heating water to the necessary temperature and pressure; an insulated stator and rotor, the stator having an inlet for liquid water and an outlet for wet vapor exhaust; a compressor for supplying gas into a separating chamber and then to the burner; a pump for transmitting liquid water from the stator to the heat exchanger, an injector for injecting liquid water under pressure from the heat exchanger into the stator, a metering device for controlling the amount of water injected into the cylinder, and a separating chamber for separating liquid water from dry saturated vapor.

It is claimed:

1. A method of operating a rotary external combustion engine having a stator therein defining a working space, wherein energy is supplied to the working space by means of a vaporizable heat-transfer medium, which comprises
    (1) in a compression cycle wherein the working space volume decreases, compressing gaseous heat-transfer medium present in the working space;
    (2) generating externally of the working space heated heat-transfer medium under a pressure such as to maintain the medium in the liquid state;
    (3) injecting into the compressed gaseous medium in the working space said heated pressurized liquid medium, whereby part of the liquid medium spontaneously vaporizes, the remainder remaining as liquid, and raises the internal energy of the working space;
    (4) in an expansion cycle, allowing the volume of the working space to increase thereby driving the rotor, and causing some recondensation of the vaporized medium to occur;
    (5) exhausting a mixture of liquid and gaseous heat-transfer medium from the working space and leaving in the working space residual heat-transfer medium;
    (6) receiving said exhausted mixture of liquid and gaseous heat-transfer medium in a trap; and
    (7) recycling heat-transfer medium in the liquid state from the trap to step (2) for the generation of further pressurized heated liquid heat-transfer medium.

2. A method according to claim 1 wherein the heat-transfer medium is selected from the group consisting of water, an oil and mixtures thereof.

3. A method according to claim 1 or 2 wherein during the compression cycle the working space contains heat-transfer medium in both the liquid and vapor states.

4. A method according to claim 1, wherein substantially all of the heat-transfer medium exhausted from the working space is in the liquid state.

5. A method according to claim 1, wherein the heated liquid heat-transfer medium has a temperature and pressure above or below its critical point but greater than its boiling point at atmospheric pressure.

6. A method according to claim 1, wherein the exhausted medium after exhaustion is at a pressure of substantially 1 atmosphere.

7. A method according to claim 1, wherein the majority of the injected liquid medium remains in the liquid state after injection into the working space.

8. A method according to claim 1 wherein the temperature of the injected liquid medium is greater than the temperature of the working space at the time of injection.

9. A method according to claim 1 wherein the heated liquid medium is injected continuously.

10. A method according to claim 1, wherein the heat transfer medium is water, the exhaust water is recycled to the engine, heat is supplied to the medium by means of a fuel-air burner, and water is condensed from flue gases from the burner to make up any losses in the recycled water.

11. A method according to claim 1 wherein heat energy is converted into useful work with an efficiency greater than the theoretical efficiency of the Rankine cycle working between the same upper and lower temperatures.

12. A rotary external combustion engine wherein energy is supplied to a working space of the engine by means of a vaporizable heat-transfer medium, which comprises
    a stator, a rotor within the stator, a working space defined by the stator and the rotor, the volume of the working space being variable by rotation of the rotor from a minimum to a maximum volume;
    a heat exchanger for heating the heat-transfer medium externally of the working space under a pressure such as to maintain the medium in the liquid state, the heat exchanger having an inlet for receiving heat-transfer medium and an outlet for delivering heated pressurized liquid heat-transfer medium;
    a high pressure pump connected to said heat exchanger inlet for feeding liquid heat-transfer medium to the heat exchanger;
    an injector connected to the outlet of the heat exchanger and controlled to inject the heated pressurized liquid medium into the working space when the working space is near its minimum volume, whereby part of the liquid medium spontaneously vaporizes in the working space, the remainder remaining as liquid;

an outlet from the stator for exhausting heat-transfer medium from the working space when the working space is near its maximum volume;

a trap connected to the outlet from the stator for receiving a mixture of liquid and gaseous heat-transfer medium exhausted from the working space; and recycle means connected to the trap for recycling therefrom heat-transfer medium in the liquid state to the high pressure pump.

13. An engine according to claim 12, wherein the heat exchanger comprises at least one tube for containing the heat-transfer medium and a fuel-burner for heating the medium in said at least one tube whereby the heat-transfer medium is maintained in the liquid phase.

14. An engine according to claim 13 wherein the heat exchanger comprises a tube constructed in the form of an inner coil and an outer coil coaxial therewith, the burner being located within the inner coil, whereby hot flue gases from the burner pass within the inner coil and then between the inner and the outer coils.

15. An engine according to claim 13 or 14 wherein air is fed to the burner by means of a rotary compressor.

16. An engine according to claim 12 wherein the stator and the rotor are formed at least in part from a heat insulating material selected from the group consisting of plastics, fiber-reinforced resins, wood, concrete, glass and ceramics.

17. An engine according to claim 12 wherein the rotor is provided with a plurality of vanes defining with the interior of the stator a plurality of working spaces.

18. An engine according to claim 12 wherein the interior of the stator is cylindrical, and the rotor is eccentrically mounted therein and provided with a plurality of radially extending vanes defining working spaces, each vane being biased radially outwardly so as to seal against the cylindrical interior surface of the stator.

19. An engine according to claim 12, wherein the injector is provided with two inlets circumferentially spaced apart such that during rotation of the rotor at least one of the inlets remains unobscured by the rotor at all times.

20. An engine according to claim 12, wherein the outlet is disposed approximately 180° of rotation away from the injector.

21. An engine according to claim 12 wherein the outlet comprises a port in the cylinder wall which comes into communication with the working space as the volume of the working space approaches its maximum.

22. An engine according to claim 12 having a compression ratio between approximately 1.5:1 and 20:1.

23. An engine according to claim 22 wherein the recycle means is a closed circuit operable at a pressure of substantially atmospheric pressure.

24. An engine according to claim 24 wherein said trap includes an inlet for air, an outlet for feeding air and heat-transfer medium vapor to a burner of the heat exchanger, and an outlet for liquid medium connected to the heat exchanger.

25. An engine according to claim 12 wherein the injector is arranged to continuously inject liquid medium into the stator interior.

26. An engine according to claim 12 wherein the stator and rotor are so constructed that some liquid medium is retained in the working end space after the exhaust of heat transfer medium.

27. An engine according to claim 26 wherein the stator is provided with a recess for retaining the liquid medium.

28. An engine according to claim 26 wherein the rotor is provided with a recess for retaining the liquid medium.

29. A rotary external combustion engine wherein heat energy is supplied to a working space of the engine by means of heated pressurized liquid water at a temperature greater than the boiling point of water at atmospheric pressure, which comprises a stator, a rotor within the stator, a working space defined by said stator and rotor, the volume of the working space being variable by rotation of the rotor from a minimum to a maximum volume;

a heat exchanger for heating the liquid water externally of the working space to a temperature above the boiling point of water at atmospheric pressure, the heat exchanger having (1) an inlet for receiving liquid water and an outlet for delivering heated water, (2) at least one tube for containing said liquid water, and (3) a fuel-burner disposed for heating the liquid water in said at least one tube;

pressurizing means connected to said at least one tube of the heat exchanger for maintaining said heated water in the liquid state;

an injector mounted on said stator and connected to the outlet of the heat exchanger for receiving heated pressurized liquid water, the injector being arranged to inject heated pressurized liquid water into the working space when the working space is near its minimum volume whereby part of the liquid water spontaneously vaporizes in the working space, the remainder remaining as liquid;

an outlet from the stator for exhausting cooled water from the working space when the working space is near its maximum volume, the majority of said cooled water being exhausted in the liquid state;

a trap connected to the outlet from the stator for receiving a mixture of liquid and gaseous heat-transfer medium exhausted from the working space; and recycle means connected to the trap for recycling therefrom heat-transfer medium in the liquid state to the high pressure pump.

* * * * *

UNITED STATES PATENT AND TRADEMARK OFFICE
CERTIFICATE OF CORRECTION

PATENT NO. : 4,437,308
DATED : March 20, 1984
INVENTOR(S) : Victor Herbert Fischer It is certified that error appears in the above-identified patent and that said Letters Patent is hereby corrected as shown below:

Column 13, line 56, in claim 24, "24" should be --23--.

Signed and Sealed this

Twenty-fifth Day of September 1984

[SEAL]

Attest:

GERALD J. MOSSINGHOFF

Attesting Officer

Commissioner of Patents and Trademarks